United States Patent

Ishida et al.

[11] Patent Number: 5,890,917
[45] Date of Patent: Apr. 6, 1999

[54] PC CARD SOCKET CONNECTOR AND PC CARD WITH SAME

[75] Inventors: Mitsuo Ishida; Shoichi Tomioka, both of Tokyo, Japan

[73] Assignee: Hirose Electric Co., Ltd., Tokyo, Japan

[21] Appl. No.: 688,016

[22] Filed: Jul. 29, 1996

[30] Foreign Application Priority Data

Aug. 11, 1995 [JP] Japan ...................................... 7-226059

[51] Int. Cl.⁶ .................................................. H01R 13/648
[52] U.S. Cl. .......................... 439/101; 439/76.1; 439/609
[58] Field of Search ..................................... 439/101, 108, 439/95, 607, 76.1, 946, 609

[56] References Cited

U.S. PATENT DOCUMENTS 5,210,442   5/1993   Ishimoto .................................. 439/946
5,564,933  10/1996   Bouchan et al. ........................ 439/76.1

*Primary Examiner*—Gary F. Paumen
*Attorney, Agent, or Firm*—Kanesaka & Takeuchi

[57] ABSTRACT

A metal panel (4) is provided to cover the entire PC card (P). The ground plate (10) has an attaching portion and outer and inner terminals (11) and (12) extending rearwardly from the attaching portion. The attaching portion is attached to the attaching means of the housing (6). The outer and inner terminals (11) and (12) contact the inner face of the panel (4) and the ground circuit (3B) of an inner board (3), respectively.

3 Claims, 7 Drawing Sheets

5,890,917

PC CARD SOCKET CONNECTOR AND PC CARD WITH SAME

BACKGROUND OF THE INVENTION

1. Field of the Invention

The present invention relates to PC card socket connector and PC cards having such socket connectors.

2. Description of the Prior Art

PC cards have a front socket connector for connection with a mating connector when it is inserted into equipment. As shown in FIG. 5, for example, a conventional PC card 51 have a metal ground plate 53 with a plurality of semi-circular projections 52 provided in the outer face of a front end portion. The semi-circular projections 52 projects from the ground plate 53 so as to make sure contact with a shield plate of the mating connector. Since it is desirous to shield the entire PC card 51, an outer metal panel 54 is provided. However, the panel 54 has a cutout portion 54A in the front end portion so as to expose the semi-circular projections 52.

As shown in FIG. 6, the PC card 51 has a socket connector 55 at the front end for connection with a mating connector 71. The socket connector 55 has a number of female contact elements 56 (of the rectangular cylinder type) arranged in two tiers in a direction perpendicular to the sheet for connection with male connector elements 72 of the mating connector 71. The contact elements 56 have upper and lower tongue portions extending diagonally rearwardly from the front edge to make sure contact with the mating contact element 72. A contact portion 56A extends rearwardly from the rear end of each contact element 56 for contact with a corresponding signal circuit provided on an inner board 58. Ground circuits are provided between the signal circuits arranged on the inner board 58 in a direction perpendicular to the sheet.

The ground plate 53 provided on the upper face of a housing 57 has a ground terminal 53A which is bent diagonally downwardly at the back of the semi-circular projections 52 to make resilient contact with the ground circuit of the inner board 58. The ground terminal 53A runs under the panel 54 from the cutout portion 54A of the panel 54.

A shield plate 73 is provided on the mating connector 71 so as to have a front contact portion folded back into the PC card receiving recess 74.

As shown in FIG. 7, when the PC card 51 is connected to the mating connector 71 by the socket connector 55, the contact elements 56 of the PC card are brought into contact with the contact elements 72 of the mating connector 71 while the semi-circular projections 52 of the ground plate 53 are brought into contact with the contact portion 75 of the shield plate 73 so that the ground circuit of the PC card are grounded through the shield plate 73 and the ground plate 53.

Since the thickness of PC cards is regulated by the standards, it is necessary to provide the panel 54 with the cutout portion 54A where there is the ground plate 53 of the socket connector 55. Consequently, there is no shielding at a gap between the ground plate 53 and the cutout portion 54A of the panel 54. In addition, the cutout portion 54A reduces the strength of the panel 54. Moreover, the cutout portion 54A permits dust and/or water to enter. Also, it makes the appearance poor.

SUMMARY OF THE INVENTION

Accordingly, it is an object of the invention to provide a PC card socket connector having a panel covering the entire area despite the presence of a ground plate, and a PC card with such a connector.

It is assumed that the socket connector is provided at the front end of a PC card.

The PC card has an inner board on which signal and ground circuits are provided. These circuits have contact portions for contact with the corresponding contact elements and ground plate of the socket connector.

The socket connector has a number of contact elements extending through the receiving holes of a housing. Each contact element has a connection portion within the receiving hole for connection with the contact element of a mating connector and a contact portion extending rearwardly from the receiving hole for contact with the signal circuit of the inner board.

The PC card is provided with a metal panel which covers the entire card including the socket connector area. A ground contact portion is provided at the front end of the panel for contact with the contact portion of the shield plate of a mating connector.

The housing has an attaching means to which an attaching portion of the ground plate is attached. The ground plate has a plurality of terminals extending rearwardly. The terminals consist of inner and outer terminals extending opposite directions. When the ground plate is mounted in the housing, the outer and inner terminals are brought into contact with the inner surface of a panel and the ground circuit of an inner board, respectively.

The ground circuit on the inner board is grounded through the inner and outer terminals of the ground plate, the panel, and the contact portion of the shield plate on the mating connector. The PC card is covered completely by the panel, leaving no gap at the socket connector. Thus, no dust enters the PC card and, also, the appearance is improved.

DESCRIPTION OF THE PREFERRED EMBODIMENT

Figure 1:
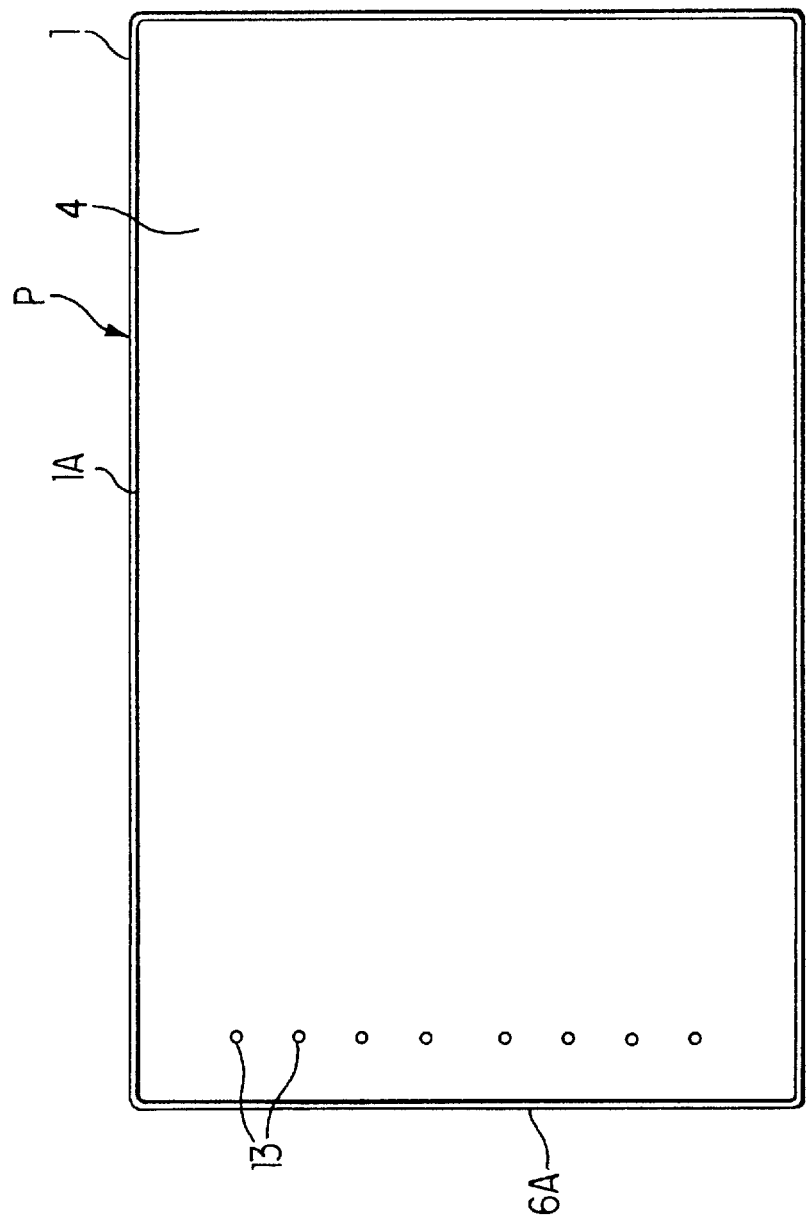
FIG. 1 is a plan view of a PC card according to an embodiment of the invention.
Figure 2:
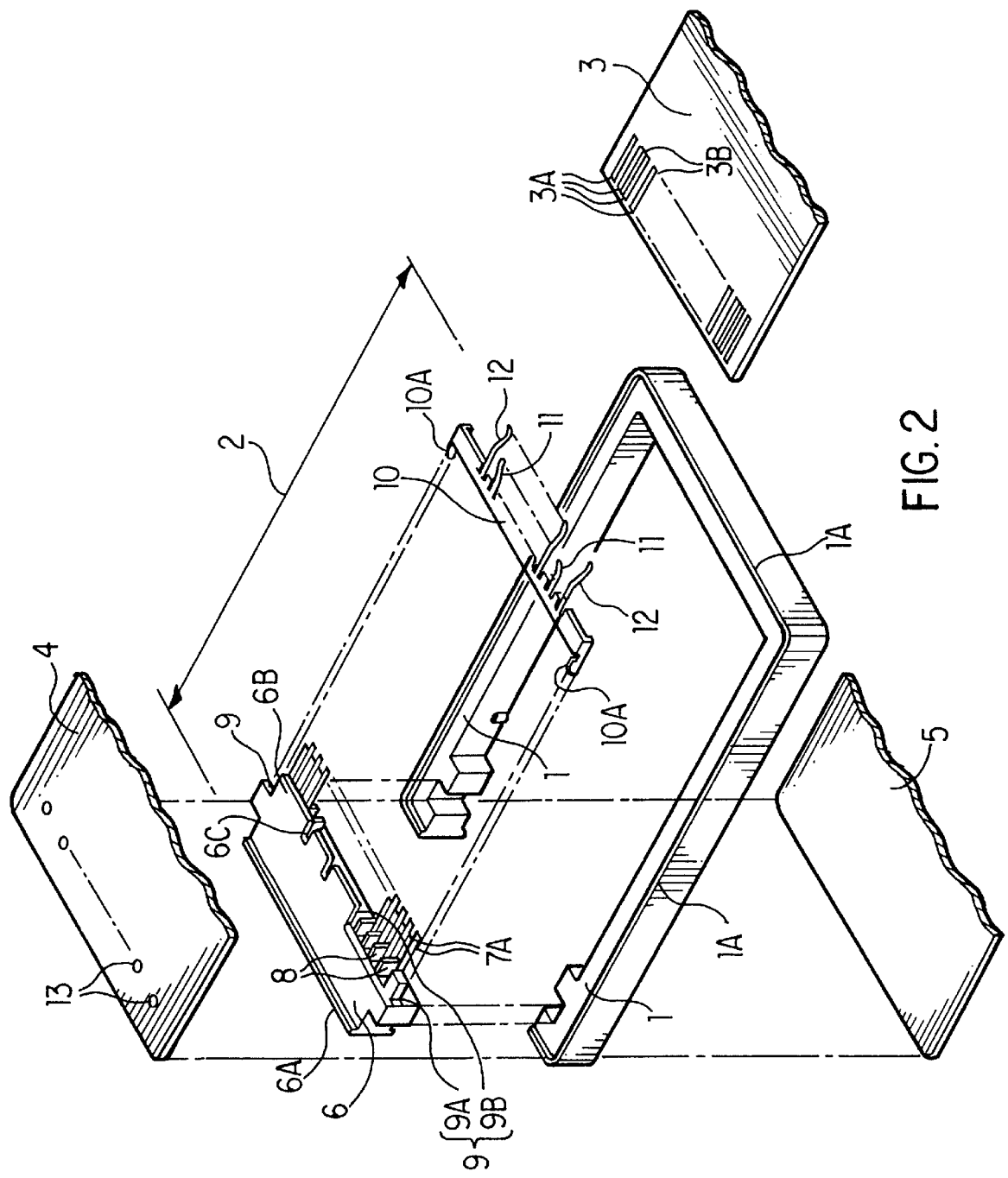
FIG. 2 is an exploded perspective view of an essential part of the PC card of FIG. 1.

An embodiment of the invention will be described below with reference to FIGS. 1–4, wherein FIG. 1 is a plan view of a PC card according to an embodiment of the invention; FIG. 2 is an exploded perspective view of the essential part thereof; and FIG. 3 is a sectional view of the connector before connection to a mating connector.

Figure 3:
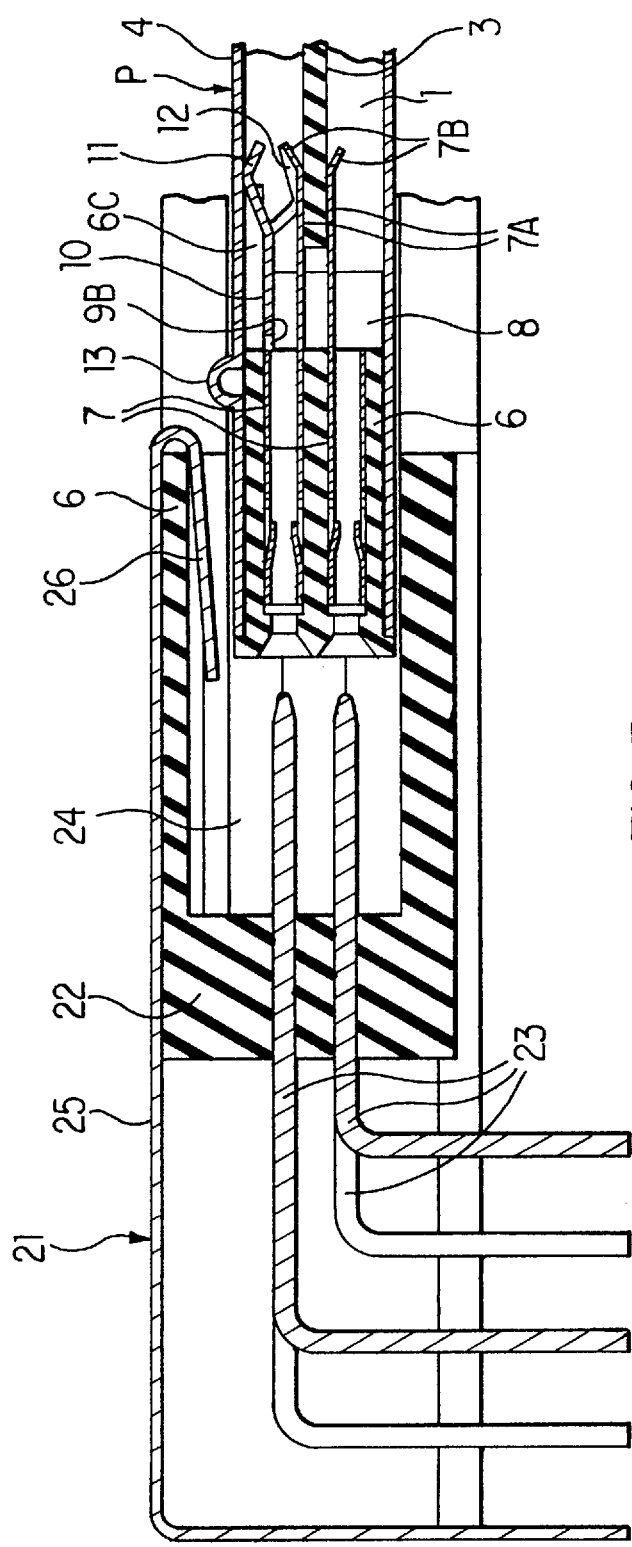
FIG. 3 is a sectional view of the PC card and a mating connector before connection.

In FIGS. 1–3, a PC card P includes a U-shaped frame 1 made from an insulating material, a socket connector 2 provided at the open front end of the frame 1, an inner board 3 connected to the socket connector 2, and a pair of upper and lower metal panels 4 and 5. These panels 4 and 5 are fitted in recesses formed by thin edge portions 1A and 6A provided on the front and back sides of the frame 1 and a housing 6 of the socket connector 2 and fixed thereto by appropriate means.

The connection portions 3A of signal circuits are spaced at intervals on the inner board 3, and the connection portions 3B of the ground circuit are provided between the signal connection portions 3A (see FIG. 2).

As shown in FIG. 3, a number of receiving holes are arranged in the housing 6 in two tiers widthwise (in a direction perpendicular to the sheet) and receive female contact elements 7. Each contact element 7 has a rectangular cylindrical portion having an upper and lower pieces bent inwardly within the receiving hole and a contact portion 7A extending rearwardly from the cylindrical portion. The contact portions 7A have an inclined portion 7B for easy insertion of the inner board 3. As shown in FIG. 2, separation walls 8 are provided on the housing 6 between the respective contact elements 7.

The housing 6 has an attaching means 9 which has a pair of apertures 9A (FIG. 2) at opposite ends and an insertion space 9B (FIG. 3) formed between the separate walls 8 and the extended portion 6B of the housing 6 into which the flat portion of the ground plate 10 is inserted. When the ground plate 10 is inserted into the insertion space 9B, a pair of attaching legs 10A of the ground plate 10 are press fitted into the apertures 9A for attachment. The ground plate 10 has outer terminals 11 extending rearwardly and diagonally upwardly and inner terminals 12 extending rearwardly and diagonally downwardly. The inner terminals 12 are disposed such that when the inner board 3 is inserted between the contact portions 7A of the upper and lower contact elements 7, they are brought into contact with the connection portions 3B of the ground circuits on the inner board 3. The outer terminals 11 extend through slits 6C (FIG. 2) of the extended portion 6B to contact the inner face of the panel 4 mounted on the frame 1 and the housing 6.

A plurality of semi-circular projections 13 are provided on the front portion of the panel 4 but they may be omitted.

As shown in FIG. 3, a mating connector 21 includes a housing 22 made of an insulation material and a number of L-shaped male contact elements 23 extending through the housing 22. The housing 22 has a receiving cavity 24 for receiving the PC card. The contact elements 23 are disposed so as to contact the female contact elements 7 of the socket connector 2 within the receiving cavity 24. The other ends of the contact elements 23 are bent at right angles to extend downwardly. A shielding plate 25 provided on the housing 22 of the mating connector 21 has a plurality of contact portions 26 which are folded back into the receiving cavity 24. The contact portions 26 are disposed so as to contact the semi-circular projections 13 of the panel 4.

The PC card having the socket connector is connected to a mating connector as follows.

Figure 4:
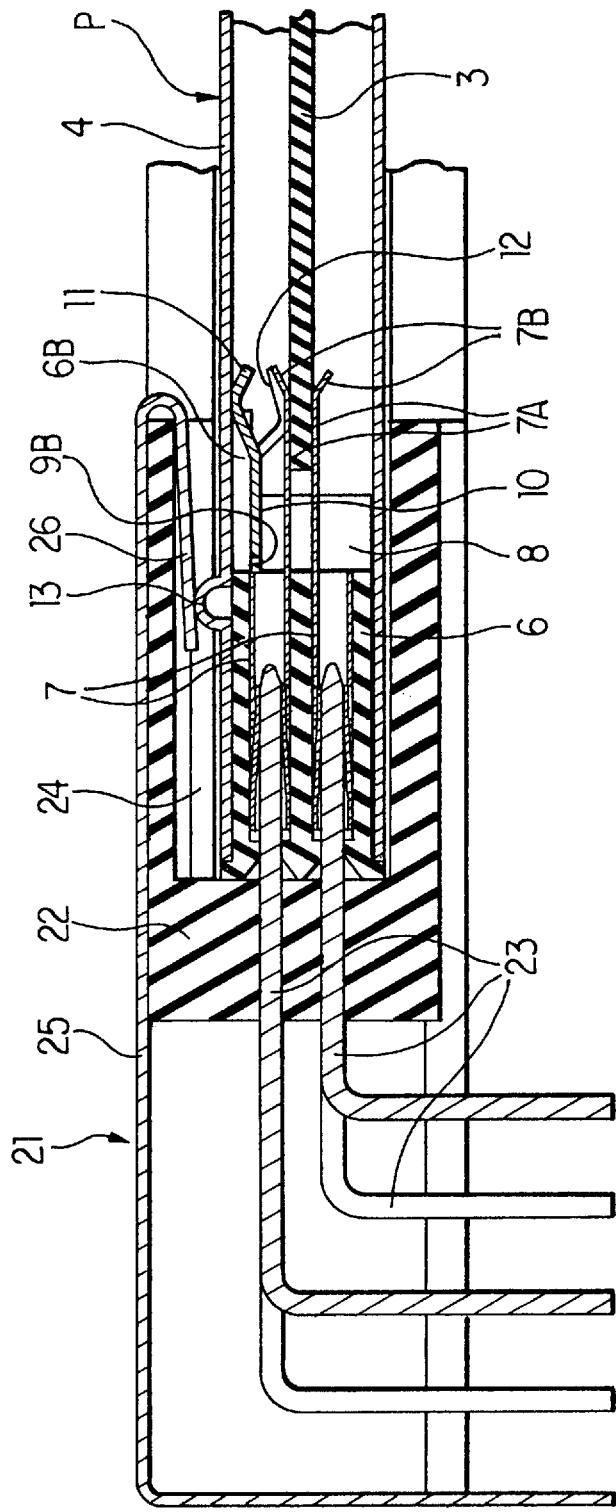
FIG. 4 is a sectional view of the PC card and the mating connector in connection.
Figure 5:
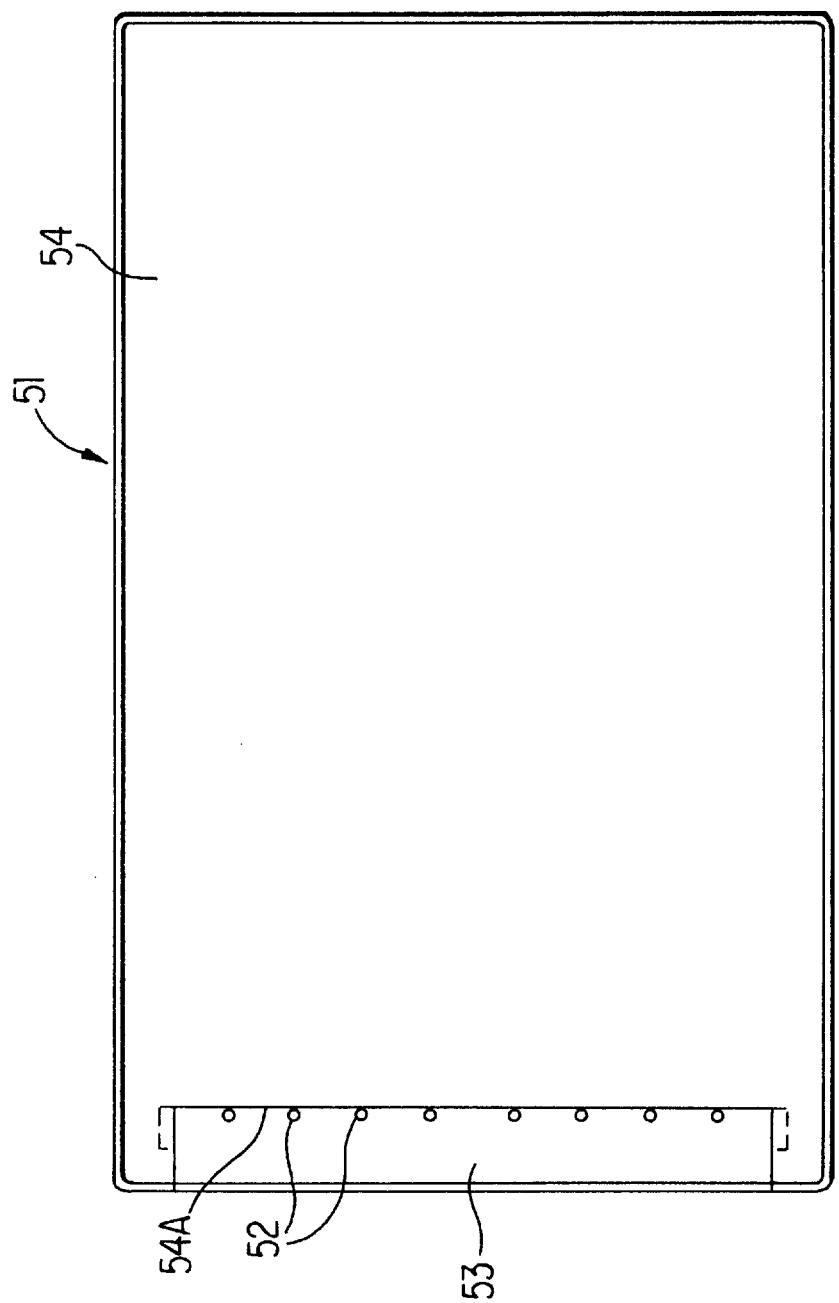
FIG. 5 is a plan view of a conventional PC card.
Figure 6:
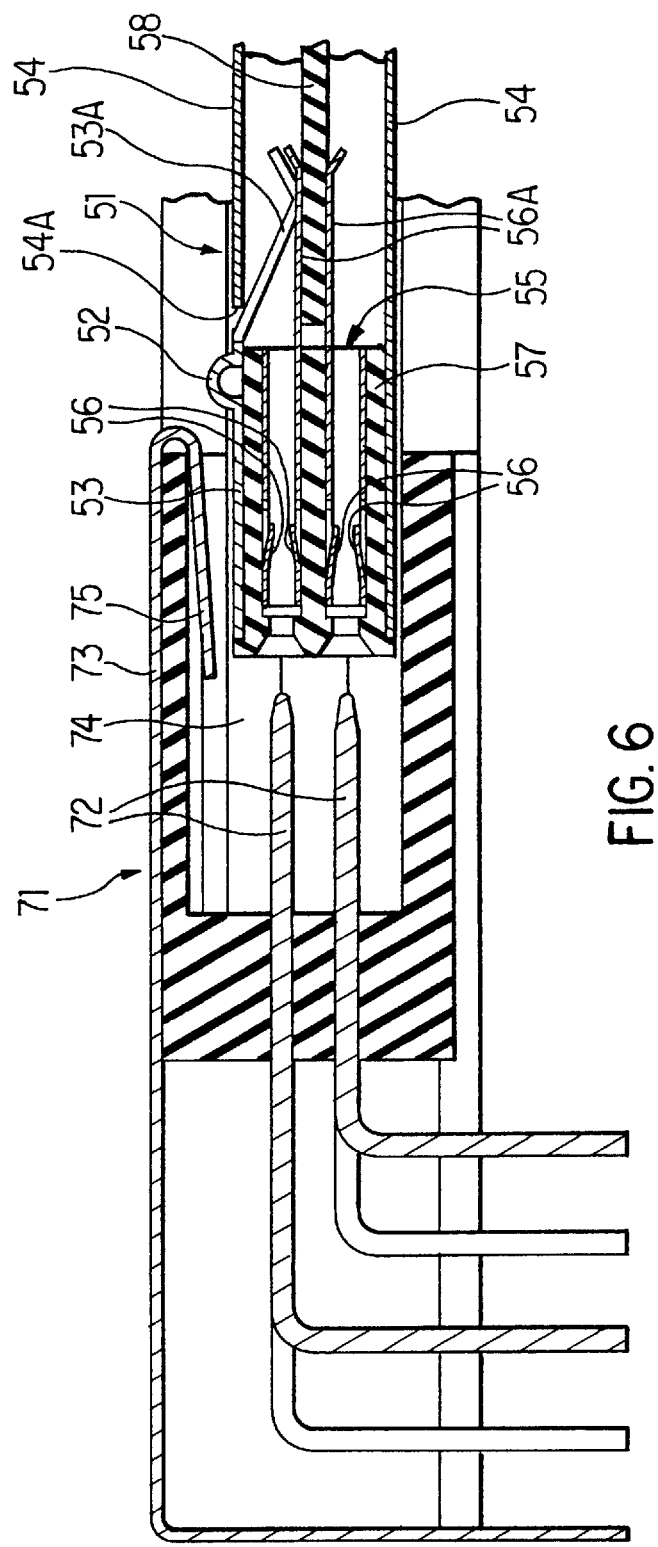
FIG. 6 is a sectional view of the PC card of FIG. 5 and a mating connector before connection.
Figure 7:
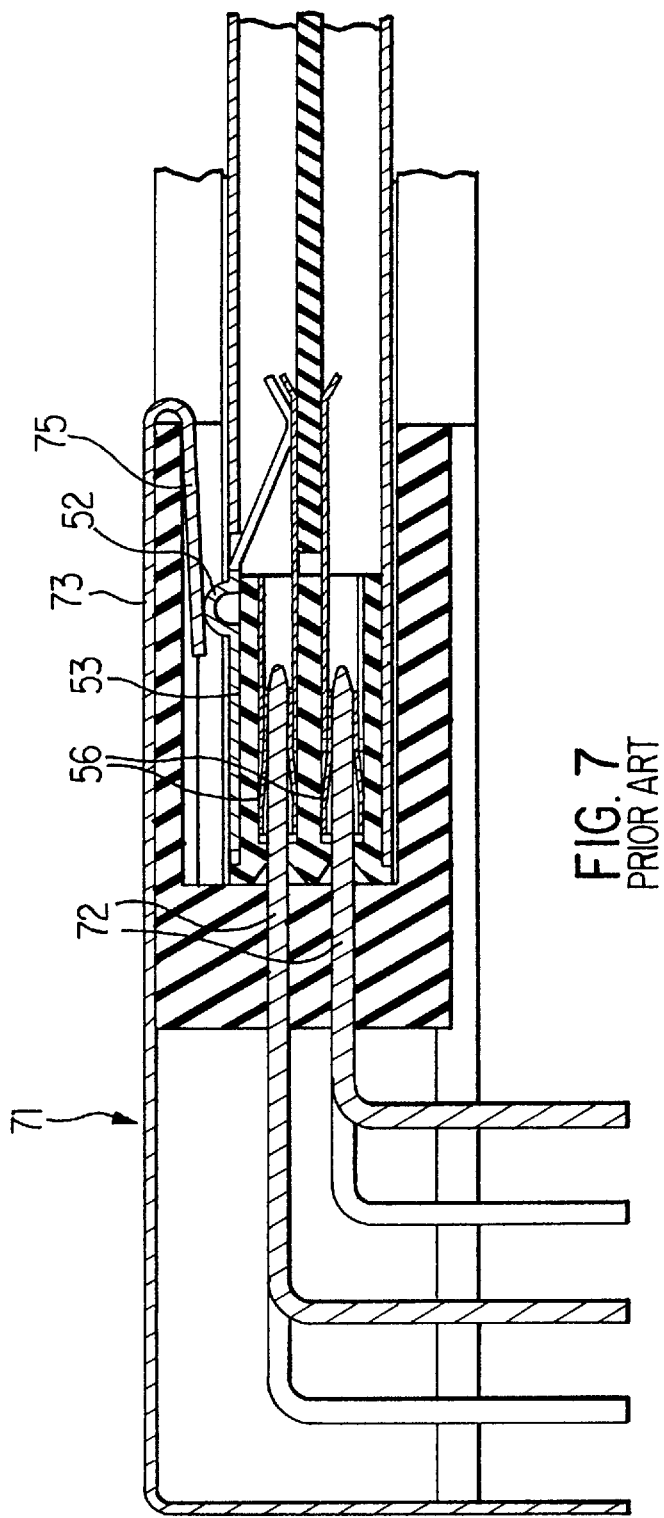
FIG. 7 is a sectional view of the PC card and the mating connector in connection.

The PC card P is connected to the mating connector 21 in such a way as shown in FIGS. 3 and 4. The male contact elements 23 of the mating connector 21 are brought into contact with the female contact elements 7 of the PC card for electrical connection with the connection portions 3A of signal circuitry on the inner board 3 while the connection portions 3B of ground circuitry are brought into contact with the contact portion 26 of the shield plate through the inner terminals 12 and outer terminals 11 of the ground plate 10, the panel 4, and semi-circular projections 13 for grounding by the shield plate 25.

Thus, the PC card is completely covered by the panel and grounded by the ground plate without increasing the thickness.

As has been described above, the entire PC card is covered by the panel without increasing the thickness and without a gap in the panel so that the PC card is protected from dust and/or water. In addition, the panel is stronger and looks better than before.

What is claimed is:

1. A PC card socket connector provided at a front end of a PC card for connection with a mating connector having a shielding plate, said PC card comprising an inner board with signal and ground circuits provided thereon, comprising:

a housing made of an insulating material;

contact elements supported by said housing for contact with said signal circuits;

a metal panel provided on said housing to cover an entire surface of said PC card and having a projection at a front portion thereof for contact with said shielding plate: and a ground plate attached to said housing and having a flat section extending substantially across said PC card and outer and inner terminals arranged along said flat section for contact with said metal panel and said ground circuit, respectively, to connect said ground circuit to said shielding plate of said mating connector while said contact elements are brought into contact with corresponding contact elements of said mating connector when said PC card is connected to said mating connector.

2. A PC card socket connector according to claim 1, wherein said metal panel has a ground contact portion on an outer surface thereof to assure connection between said ground plate and said shielding plate of said mating connector.

3. A PC card having at a front end thereof a PC card socket connector of claim 1 for connection with a mating connector.

\* \* \* \* \*